United States Patent
Mula et al.

(10) Patent No.: US 11,171,884 B2
(45) Date of Patent: Nov. 9, 2021

(54) EFFICIENT MEMORY UTILIZATION AND EGRESS QUEUE FAIRNESS

(71) Applicant: MELLANOX TECHNOLOGIES TLV LTD., Raanana (IL)

(72) Inventors: Liron Mula, Ramat Gan (IL); Niv Aibester, Herzliya (IL); Barak Gafni, Campbell, CA (US)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 0 days.

(21) Appl. No.: 16/351,684

(22) Filed: Mar. 13, 2019

(65) Prior Publication Data

US 2020/0296057 A1 Sep. 17, 2020

(51) Int. Cl.
| | |
|---|---|
| *H04L 12/935* | (2013.01) |
| *H04L 12/867* | (2013.01) |
| *H04L 12/813* | (2013.01) |
| *H04L 12/931* | (2013.01) |
| *H04L 12/801* | (2013.01) |
| *H04L 12/865* | (2013.01) |

(52) U.S. Cl.
CPC .......... *H04L 49/3027* (2013.01); *H04L 47/15* (2013.01); *H04L 47/20* (2013.01); *H04L 47/629* (2013.01); *H04L 47/6275* (2013.01); *H04L 49/201* (2013.01)

(58) Field of Classification Search
CPC ..... H04L 49/3027; H04L 47/15; H04L 47/20; H04L 47/6275; H04L 49/201
See application file for complete search history.

(56) References Cited

U.S. PATENT DOCUMENTS

| | | |
|---|---|---|
| 6,233,244 B1 | 5/2001 | Runaldue et al. |
| 6,349,340 B1 | 2/2002 | Dyer et al. |
| 6,542,502 B1 | 4/2003 | Herring et al. |
| 6,606,317 B1 | 8/2003 | Beadle et al. |
| 7,126,946 B2 | 10/2006 | Beadle et al. |
| 7,152,231 B1 | 12/2006 | Galluscio et al. |
| 7,606,249 B1 * | 10/2009 | Swenson ............. H04L 47/6255 370/412 |
| 7,769,028 B2 | 8/2010 | Boley et al. |

(Continued)

*Primary Examiner* — Jae Y Lee
*Assistant Examiner* — Mohammed M Murshid
(74) *Attorney, Agent, or Firm* — Kligler & Associates Patent Attorneys Ltd

(57) ABSTRACT

In one embodiment, a network device includes multiple ports to be connected to a packet data network so as to serve as both ingress and egress ports in receiving and forwarding of data packets including unicast and multicast data packets, a memory coupled to the ports and to contain a combined unicast-multicast user-pool storing the received unicast and multicast data packets, and packet processing logic to compute a combined unicast-multicast user-pool free-space based on counting only once at least some of the multicast packets stored once in the combined unicast-multicast user-pool, compute an occupancy of an egress queue by counting a space used by the data packets of the egress queue in the combined unicast-multicast user-pool, apply an admission policy to a received data packet for entry into the egress queue based on at least the computed occupancy of the egress queue and the computed combined unicast-multicast user-pool free-space.

23 Claims, 3 Drawing Sheets

(56) References Cited

U.S. PATENT DOCUMENTS

| | | | |
|---|---|---|---|
| 7,936,753 B1 | 5/2011 | Colloff et al. | |
| 7,990,860 B2 | 8/2011 | Smith et al. | |
| 8,050,263 B1 | 11/2011 | Walsh | |
| 10,015,112 B2 | 7/2018 | Roitshtein et al. | |
| 10,205,604 B2* | 2/2019 | Liu | H04L 12/18 |
| 10,419,329 B2* | 9/2019 | Levi | H04L 45/16 |
| 10,567,273 B2* | 2/2020 | Panchagnula | H04L 49/30 |
| 2002/0075871 A1 | 6/2002 | Blanc et al. | |
| 2006/0114848 A1 | 6/2006 | Eberle et al. | |
| 2007/0189290 A1 | 8/2007 | Bauer | |
| 2007/0291755 A1 | 12/2007 | Cheng et al. | |
| 2009/0073978 A1 | 3/2009 | Craddock et al. | |
| 2010/0325370 A1 | 12/2010 | Cummings et al. | |
| 2013/0250762 A1 | 9/2013 | Assarpour | |
| 2014/0198638 A1* | 7/2014 | Campbell | H04L 49/50 370/230 |
| 2015/0201312 A1 | 7/2015 | Tjahjono et al. | |
| 2015/0365333 A1 | 12/2015 | Brown | |
| 2016/0044695 A1* | 2/2016 | Gunner | H04L 49/205 370/336 |
| 2016/0142317 A1 | 5/2016 | Yang et al. | |
| 2016/0337142 A1* | 11/2016 | Attar | H04L 47/6255 |
| 2016/0337258 A1 | 11/2016 | Attar et al. | |
| 2017/0063613 A1 | 3/2017 | Bloch et al. | |
| 2017/0163567 A1* | 6/2017 | Roitshtein | H04L 49/205 |
| 2018/0287928 A1 | 10/2018 | Levi et al. | |

\* cited by examiner

EFFICIENT MEMORY UTILIZATION AND EGRESS QUEUE FAIRNESS

FIELD OF THE INVENTION

The present invention relates to buffering data packets, and in particular, but not exclusively to, applying egress queue fairness.

BACKGROUND

Switches used in high-speed packet networks, such as Ethernet and InfiniBand networks, typically contain buffer memories. Packets received by the switch through one of its ports are stored temporarily in a buffer memory while awaiting transfer to the appropriate egress port or possibly, in the case of multicast packets or replicated unicast packets, to multiple egress ports. Although buffer memory may be allocated statically to each port, many modern packet switches use a shared memory, in which buffer space is allocated dynamically to different ports and queues depending on traffic load, congestion state, egress queue priorities and memory availability. However, using a shared memory allocated among many queues leads to problems of egress queue fairness.

As one example, US Patent Publication 2017/0163567 of Roitshtein, et al., (herein after the '567 Patent Application) which is hereby incorporated by reference, describes a communication apparatus including multiple interfaces connected to a packet data network. A memory is coupled to the interfaces and configured as a buffer to contain packets received through ingress interfaces while awaiting transmission to the network via respective egress interfaces. Packet processing logic is configured, upon receipt of a multicast packet through an ingress interface, to identify a number of the egress interfaces through which respective copies of the multicast packet are to be transmitted, to allocate a space in the buffer for storage of a single copy of the multicast packet, to replicate and transmit multiple copies of the stored copy of the multicast packet through the egress interfaces, to maintain a count of the replicated copies that have been transmitted, and when the count reaches the identified number, to release the allocated space in the buffer.

Embodiments of the '567 Patent Publication provide techniques for handling of multicast packets, and specifically for accounting of buffer space in a switch, that facilitate more accurate and efficient handling of available memory. In the disclosed embodiments, buffer control logic in the switch allocates shared buffer space for only a single copy of each multicast packet (and no more than this single copy) even when multiple copies are to be forwarded through different egress interfaces. The buffer control logic keeps track of the number of copies of the packet that are to be transmitted, as well as the number of copies that actually have been transmitted, in order to track the need for buffer space and release the buffer space when all copies have been transmitted.

Embodiments of the '567 Patent Publication are typically implemented in a communication apparatus that comprises multiple interfaces, such as a network switch with multiple ports, connected to a packet data network. The interfaces serve as both ingress and egress interfaces in receiving and forwarding of data packets from and to the network by the apparatus. A memory within the apparatus, coupled to the interfaces, serves as a buffer to contain packets received through the ingress interfaces while the packets await transmission to the network via the appropriate egress interfaces.

In the disclosed embodiments, the memory is configured as a shared buffer and is used for both unicast and multicast packets, although different accounting mechanisms are used to track and release the allocations of buffer space used by the different packet types. Upon receipt of a multicast packet through an ingress interface, packet processing logic in the apparatus identifies and counts the number of egress interfaces through which respective copies of the multicast packet are to be transmitted, but allocates space in the shared buffer for storage of only a single copy, as noted above. The packet processing logic replicates and sends multiple copies of the stored copy of the multicast packet through the egress interfaces and maintains a count of the replicated copies that have been sent. In the disclosed embodiments, the count is maintained centrally; but alternatively, the count may be stored in another location and may be updated each time a packet copy is sent or after sending a certain number of packets. (The logic may either count up to the identified number or, equivalently, may set an initial counter value to the identified number and count down to zero.) When the count reaches the number of required copies that was identified initially, the packet processing logic releases the allocated space in the shared buffer, so that the buffer space can be reused.

The '567 Patent Publication describes that maintaining such a count of transmitted copies of the multicast packet is complicated by the fact that each egress interface has its own queue, which determines when the respective copy will actually be transmitted. The space allocated to store the single copy of the incoming packet should be preserved until all copies have been transmitted. Furthermore, in some cases, the copies of the multicast packet are transmitted through the egress ports at two or more different levels of quality of service (QoS), each with its own queue and its own count of copies to be transmitted. Mechanisms for maintaining the counts of transmitted packet replicas and efficiently managing the allocation and release of buffer space under these circumstances are described in greater detail in the '567 Patent Publication.

US Patent Publication 2016/0337142 of Attar, et al., describes a network switch including a buffer to store network packets and packet descriptors (PDs) used to link the packets into queues for output ports. The buffer and PDs are shared among the multiple traffic pools. The switch receives a multicast packet for queues in a given pool. The switch determines if there is unused buffer space available for packets in the given pool based on a pool dynamic threshold, if there is unused buffer space available for packets in each queue based on a queue dynamic threshold for the queue, if there are unused PDs available to the given pool based on a pool dynamic threshold for PDs, and if there are unused PDs available for each queue based on a queue dynamic threshold for PDs for the queue. The network switch admits the packet only into the queues for which all of the determining operations pass.

US Patent Publication 2016/0142317 of Yang, et al. describes a method of managing a buffer (or buffer memory) including utilizing one or more shared pool buffers, one or more port/priority buffers and a global multicast pool. When packets are received, a shared pool buffer is utilized; however, if a packet does not fit in the shared pool buffer, then the appropriate port/priority buffer is used. If the packet is a multicast packet, then the global multicast pool is utilized for copies of the packet.

US Patent Publication 2010/0325370 of Cummings, et al., describes a shared memory having a plurality of receive ports and a plurality of transmit ports characterized by a first data rate. A memory includes a plurality of memory banks organized in rows and columns. Operation of the memory array is characterized by a second data rate. Non-blocking receive crossbar circuitry is operable to connect any of the receive ports with any of the memory banks. Non-blocking transmit crossbar circuitry is operable to connect any of the memory banks with any of the transmit ports. Buffering is operable to decouple operation of the receive and transmit ports at the first data rate from operation of the memory array at the second data rate. Scheduling circuitry is configured to control interaction of the ports, crossbar circuitry, and memory array to effect storage and retrieval of frames of data in the shared memory by sequentially querying the plurality of ports for the frames of data, and arbitrating among a subset of the ports having the frames of data to assign starting locations in the memory banks such that the shared memory is fully provisioned for all of the ports simultaneously operating at the maximum port data rate.

US Patent Publication 2015/0365333 of Brown describes a switch that includes a reserved pool of buffers in a shared memory. The reserved pool of buffers is reserved for exclusive use by an egress port. The switch includes pool select logic which selects a free buffer from the reserved pool for storing data received from an ingress port to be forwarded to the egress port. The shared memory also includes a shared pool of buffers. The shared pool of buffers is shared by a plurality of egress ports. The pool select logic selects a free buffer in the shared pool upon detecting no free buffer in the reserved pool. The shared memory may also include a multicast pool of buffers. The multicast pool of buffers is shared by a plurality of egress ports. The pool select logic selects a free buffer in the multicast pool upon detecting an IP Multicast data packet received from an ingress port.

SUMMARY

There is provided in accordance with an embodiment of the present disclosure, a network device, including multiple ports configured to be connected to a packet data network so as to serve as both ingress and egress ports in receiving and forwarding of data packets including unicast data packets and multicast data packets from and to the network by the device, a memory coupled to the ports and configured to contain a combined unicast-multicast user-pool storing the received unicast and multicast data packets assigned to a plurality of unicast and multicast egress queues while awaiting transmission to the network, and packet processing logic configured to compute a combined unicast-multicast user-pool free-space based on a size of the combined unicast-multicast user-pool less a space used in the combined unicast-multicast user-pool by the unicast data packets and the multicast data packets, the space used by the multicast data packets being based on counting only once each of at least some of the multicast packets stored once in the combined unicast-multicast user-pool but assigned to at least two egress queues of the plurality of unicast and multicast egress queues, compute an occupancy of each at least one egress queue of the plurality of unicast and multicast egress queues by counting a space used by the data packets of the at least one egress queue in the combined unicast-multicast user-pool, and apply an admission policy to a received data packet for entry into the at least one egress queue based on at least the computed occupancy of the at least one egress queue and the computed combined unicast-multicast user-pool free-space.

Further in accordance with an embodiment of the present disclosure the packet processing logic is configured, responsively to a result of applying the admission policy to the received data packet, to drop the received data packet, or store the received data packet in the combined unicast-multicast user-pool.

Still further in accordance with an embodiment of the present disclosure the packet processing logic is configured, responsively to the result of applying the admission policy to the received data packet, to set at least one congestion flag of the received data packet.

Additionally, in accordance with an embodiment of the present disclosure the packet processing logic is configured to apply the admission policy to the received data packet for entry into the at least one egress queue based on at least the computed occupancy of the at least one egress queue and the computed combined unicast-multicast user-pool free-space, and a weighted random early detection (WRED) profile.

Moreover, in accordance with an embodiment of the present disclosure the packet processing logic is configured to compute the space used by the multicast data packets based on counting only once each of at least some of the multicast packets stored once in the combined unicast-multicast user-pool but addressed for multiple destinations or stored once in the combined unicast-multicast user-pool but assigned multiple times to at least one of the plurality of unicast and multicast egress queues.

Further in accordance with an embodiment of the present disclosure the packet processing logic is configured to compute the occupancy of the at least one egress queue by counting a space used by each of the data packets of the at least one egress queue in the combined unicast-multicast user-pool, some of the counted data packets of the at least one egress queue also being in at least another egress queue of the plurality of unicast and multicast egress queues.

Still further in accordance with an embodiment of the present disclosure the packet processing logic is configured to apply the admission policy for entry to the plurality of unicast and multicast egress queues thereby providing egress queue fairness between at least two of the multicast egress queues of the plurality of unicast and multicast egress queues, and between at least one multicast egress queue and at least one unicast egress queue of the plurality of unicast and multicast egress queues.

Additionally, in accordance with an embodiment of the present disclosure the packet processing logic is configured to recompute the combined unicast-multicast user-pool free-space and the occupancy of each at least one egress queue periodically.

Moreover, in accordance with an embodiment of the present disclosure the packet processing logic is configured to admit the received data packet to the at least one egress queue based at least on the computed occupancy of the at least one egress queue being less than a given fraction of the computed combined unicast-multicast user-pool free-space.

Further in accordance with an embodiment of the present disclosure the given fraction is the same for different egress queues of the plurality of unicast and multicast egress queues.

Still further in accordance with an embodiment of the present disclosure the given fraction is based at least on a priority of the at least one egress queue.

There is also provided in accordance with still another embodiment of the present disclosure a egress queue fairness method, including receiving and forwarding of data packets including unicast data packets and multicast data packets from and to a network, containing a combined unicast-multicast user-pool storing the received unicast and multicast data packets assigned to a plurality of unicast and multicast egress queues while awaiting transmission to the network, computing a combined unicast-multicast user-pool free-space based on a size of the combined unicast-multicast user-pool less a space used in the combined unicast-multicast user-pool by the unicast data packets and the multicast data packets, the space used by the multicast data packets being based on counting only once each of at least some of the multicast packets stored once in the combined unicast-multicast user-pool but assigned to at least two egress queues of the plurality of unicast and multicast egress queues, computing an occupancy of each at least one egress queue of the plurality of unicast and multicast egress queues by separately counting a space used by the data packets of the at least one egress queue in the combined unicast-multicast user-pool, and applying an admission policy to a received data packet for entry into the at least one egress queue based on at least the computed occupancy of the at least one egress queue and the computed combined unicast-multicast user-pool free-space.

Additionally, in accordance with an embodiment of the present disclosure, the method includes, responsively to a result of the applying the admission policy to the received data packet dropping the received data packet or storing the received data packet in the combined unicast-multicast user-pool.

Moreover, in accordance with an embodiment of the present disclosure, the method includes, responsively to the result of the applying the admission policy to the received data, setting at least one congestion flag of the received data packet.

Further in accordance with an embodiment of the present disclosure the applying includes applying the admission policy to the received data packet for entry into the at least one egress queue based on at least the computed occupancy of the at least one egress queue and the computed combined unicast-multicast user-pool free-space, and a weighted random early detection (WRED) profile.

Still further in accordance with an embodiment of the present disclosure, the method includes computing the space used by the multicast data packets based on counting only once each of at least some of the multicast packets stored once in the combined unicast-multicast user-pool but addressed for multiple destinations or stored once in the combined unicast-multicast user-pool but assigned multiple times to at least one of the plurality of unicast and multicast egress queues.

Additionally in accordance with an embodiment of the present disclosure, the method includes computing the occupancy of the at least one egress queue by counting a space used by each of the data packets of the at least one egress queue in the combined unicast-multicast user-pool, some of the counted data packets of the at least one egress queue also being in at least another egress queue of the plurality of unicast and multicast egress queues.

Moreover, in accordance with an embodiment of the present disclosure, the method includes applying the admission policy for entry to the plurality of unicast and multicast egress queues thereby providing egress queue fairness between at least two of the multicast egress queues of the plurality of unicast and multicast egress queues, and between at least one multicast egress queue and at least one unicast egress queue of the plurality of unicast and multicast egress queues.

Further in accordance with an embodiment of the present disclosure, the method includes recomputing the combined unicast-multicast user-pool free-space and the occupancy of each at least one egress queue periodically.

Still further in accordance with an embodiment of the present disclosure, the method includes admitting the received data packet to the at least one egress queue based at least on the computed occupancy of the at least one egress queue being less than a given fraction of the computed combined unicast-multicast user-pool free-space.

Additionally, in accordance with an embodiment of the present disclosure the given fraction is the same for different egress queues of the plurality of unicast and multicast egress queues.

Moreover, in accordance with an embodiment of the present disclosure the given fraction is based at least on a priority of the at least one egress queue.

There is also provided in accordance with still another embodiment of the present disclosure a software product, including a non-transient computer-readable medium in which program instructions are stored, which instructions, when read by a central processing unit (CPU), cause the CPU to receive and forward data packets including unicast data packets and multicast data packets from and to a network, contain a combined unicast-multicast user-pool storing the received unicast and multicast data packets assigned to a plurality of unicast and multicast egress queues while awaiting transmission to the network, compute a combined unicast-multicast user-pool free-space based on a size of the combined unicast-multicast user-pool less a space used in the combined unicast-multicast user-pool by the unicast data packets and the multicast data packets, the space used by the multicast data packets being based on counting only once each of at least some of the multicast packets stored once in the combined unicast-multicast user-pool but assigned to at least two egress queues of the plurality of unicast and multicast egress queues, compute an occupancy of each at least one egress queue of the plurality of unicast and multicast egress queues by separately counting a space used by the data packets of the at least one egress queue in the combined unicast-multicast user-pool, and apply an admission policy to a received data packet for entry into the at least one egress queue based on at least the computed occupancy of the at least one egress queue and the computed combined unicast-multicast user-pool free-space.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Figure 1:
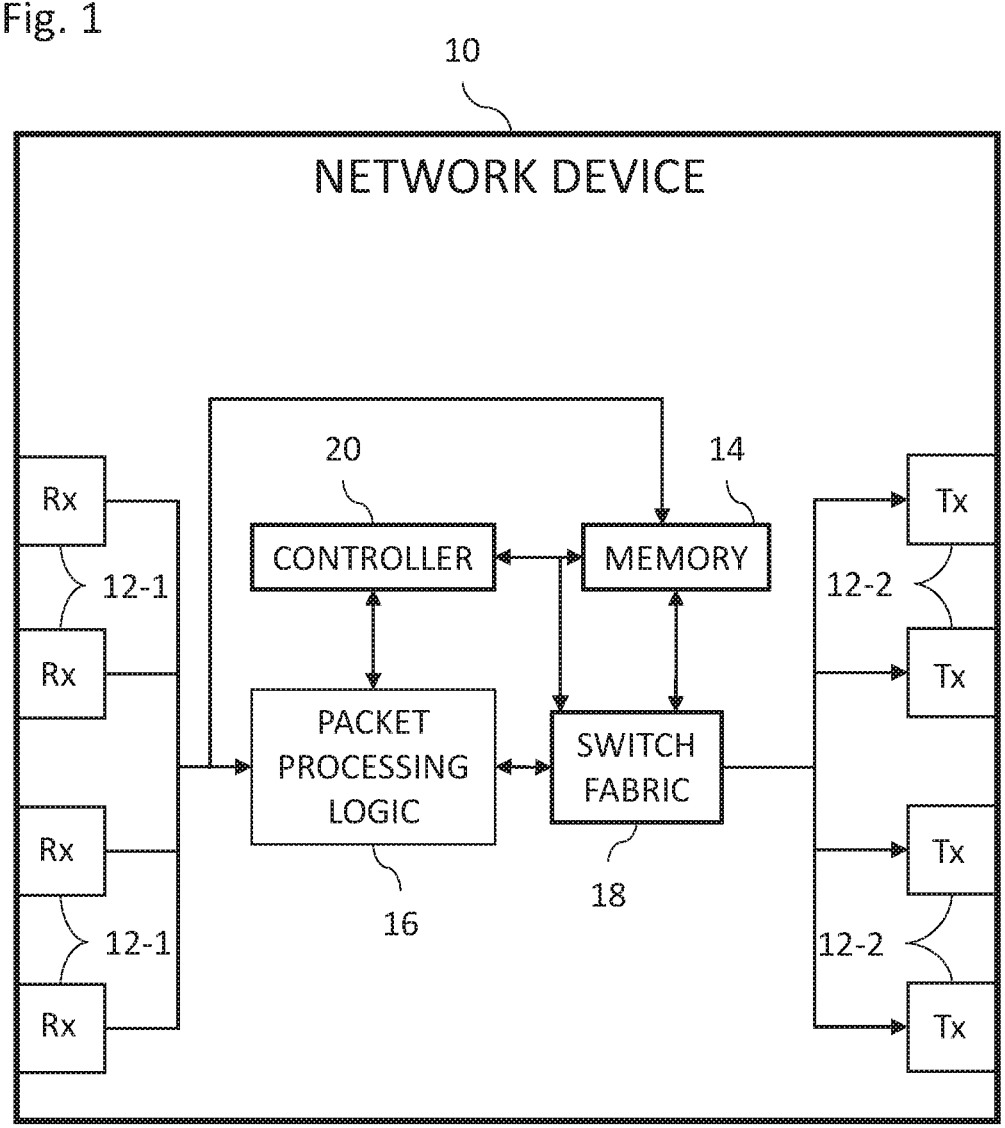
FIG. 1 is a schematic view of a network device constructed and operative in accordance with an embodiment of the present invention.

As mentioned previously, using a shared memory allocated among many queues while providing a more efficient use of the memory may lead to problems of egress queue fairness.

As will be discussed in more detail below the problem of inefficient memory use and lack of fairness is applicable to unicast and multicast queues. In addition, the problem may exist with lossy or lossless traffic.

One solution to the problem of lack of fairness is to divide a shared memory into fixed sections and allocate each section per egress queue. This solution provides fairness, but results in a suboptimal use of the shared memory.

Another solution is to allow the memory to be shared by different egress queues such that unused space is divided equally among the queues. This provides better use of the memory and creates fairness. This may work well for unicast queues in which there is a one-to-one relationship between egress queues and ports, but the solution proves to be very lacking when multicast queues, having packets going out on various egress ports while only occupying a single slot in the memory, are being considered. If the unused space not occupied by the multicast queues is used to determine whether packets are permitted into the memory, unused space will generally be low, and in some cases even less than zero, while physical memory-free-space is actually high.

An alternative solution is to provide two user-pools including a multicast user-pool and a unicast user-pool in the memory. In this scenario, multicast egress queue fairness is disabled in the multicast user-pool while unicast egress queue fairness in provided in the unicast user-pool. First, this solution is ignoring multicast egress queue fairness, and second, it leads to a less efficient use of the overall memory, not only for the multicast packets but also for the unicast packets.

Embodiments of the present invention provide both efficient use of a shared memory as well as egress queue fairness for both multicast and unicast queues by providing a single shared combined unicast-multicast user-pool for unicast and multicast traffic while maintaining fairness. Combining the packets of the unicast egress queues and the multicast egress queues into a single combined user-pool provides efficient use of the memory. To achieve fairness multicast and unicast packets are accounted for differently, as will now be described.

In addition to periodically and accurately computing a combined unicast-multicast user-pool free-space (e.g., for example each time packets enter or leave the combined unicast-multicast user-pool), an occupancy of each queue is accurately and periodically computed (e.g., for example each time packets enter or leave the queue).

When accounting for unicast, an occupancy of a unicast queue is accounted for by counting the space used by the unicast packets of the unicast queue in the combined unicast-multicast user-pool. Similarly, when accounting for multicast, an occupancy of a multicast queue is similarly accounted for by counting the space used by the multicast packets of the multicast queue in the combined unicast-multicast user-pool.

The free-space of the combined unicast-multicast user-pool is computed based on subtracting an accounting of unicast packets and an accounting of multicast packets. However, the accounting of unicast packets differs from the accounting of the multicast packets in this respect, and this is one of the unique aspects of embodiments of the present invention.

The accounting of unicast packets for computing the free-space is the same as the computed unicast queue occupancy. In contrast, the accounting of the multicast packets for computing the free-space includes computing the space used by the multicast packets (of the multicast queues) stored in the combined unicast-multicast user-pool without double-counting multicast packets stored once in the combined unicast-multicast user-pool but possibly assigned to more than one egress port and/or more than one egress queue.

The combined unicast-multicast user-pool free-space is therefore computed based on subtracting the occupancy of each unicast pool and the space used by the multicast packets (stored in the combined unicast-multicast user-pool without double-counting multicast packets stored once in the combined unicast-multicast user-pool) from a maximum size of the combined unicast-multicast user-pool.

An admission policy is applied to an incoming "ingressed" packet according to the computed combined unicast-multicast user-pool free-space and the computed occupancy of the egress queue in to which the incoming packet is being considered for entry. For example, if the computed occupancy of the egress queue multiplied by a factor is less than the combined unicast-multicast user-pool free-space, the packet may be admitted to the combined unicast-multicast user-pool. The admission policy may depend on applying variety of tests including determining if there is also room for a packet descriptor, associated with the incoming packet, that also needs storing. It should be noted that even if an incoming packet is rejected from one egress queue, the incoming packet may be admitted to, or considered for admission to, another egress queue.

Therefore, the above provides a multicast-aware-fair-queueing-accounting which maintains an accurate occupancy of all the queues (unicast and multicast queues), at any given time, such that the admission decision is performed accurately and fairly for each of the egress (unicast and multicast) queues, and for unicast and multicast packets. Fairness is enabled between multicast queues and between multicast and unicast queues.

Embodiments of the present invention have been described with reference to egress queue fairness. The teachings of the present invention, may be applied, mutatis mutandis, to egress port fairness by, for example, grouping egress queues by their respective egress port, and performing the computations for groups of egress queues grouped by their respective egress port and applying the admission policy to a group of egress queues into which a received packet is being considered for entry.

System Description

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

Reference is now made to FIG. 1, which is a schematic view of a network device 10 constructed and operative in accordance with an embodiment of the present invention.

The network device 10 may be any suitable network device for forwarding packets, for example, but not limited to, a layer 1 or a layer 2 switch, or a router. The network device 10 includes a multiplicity of ports 12, a memory 14, packet processing logic 16, switch fabric 18, and a controller 20. For the sake of simplicity other standard elements which may be included in the network device 10 have not been shown.

The multiple ports 12 are configured to be connected to a packet data network so as to serve as ingress ports 12-1 for receiving data packets (including unicast data packets and multicast data packets) from the network and egress ports 12-2 for forwarding at least some of the received data packets to the network (as some of the received data packets may be dropped in the network device 10). Each port 12 therefore has an ingress port part (Rx) 12-1 and an egress port part (Tx) 12-2. In the exemplary embodiment of FIG. 1, for the sake of simplicity, the ingress port parts 12-1 are shown on the left of FIG. 1 and the egress port parts 12-2 shown on the right of FIG. 1.

Each ingress port 12-1 may in addition to receiving data packets, terminate a physical link from an external device. Each egress port 12-2 may perform one or more of the following functions: store incoming data packets in queues, transmit data packets on an outgoing link, and perform data link and physical (Phy) layer functionality.

The packet processing logic 16 may perform one or more of the following functions: data-link-layer functions, forwarding table lookup, forward data packets to the switch fabric 18. The packet processing logic 16 is described in more detail with reference to FIGS. 3 and 4.

The switch fabric 18 is configured to selectively connect the ingress ports 12-1 with the egress ports 12-2 according to at least a destination addresses of the received data packets and perform queuing functions.

The controller 20 is configured to perform one or more of the following functions: execute routing protocols, maintain forwarding tables, and monitor queues of the egress ports and make a decision to drop one or more data packets of the received data packets responsively to the queue monitoring.

The memory 14 is coupled to the ports 12, and is configured to store the received data packets at various stages of processing in the network device 10 for example, but not limited to, while the data packets are in various queues and other buffered stages. The memory 14 may be implemented as a unitary item or as more than one memory of the same or different types of volatile memory.

The memory 14 is configured to contain a combined unicast-multicast user-pool (shown in, and described in more detail with reference to, FIG. 2) storing the received unicast and multicast data packets assigned to a plurality of unicast and multicast egress queues while awaiting transmission to the network.

A multicast packet addressed for several destinations and assigned to several respective egress ports 12-2 is generally stored only once in the combined unicast-multicast user-pool. As mentioned in the background section, US Patent Publication 2017/0163567 of Roitshtein, et al., (herein after the '567 Patent Application) which is hereby incorporated by reference, describes a communication apparatus where packet processing logic is configured, upon receipt of a multicast packet through an ingress interface, to identify a number of the egress interfaces through which respective copies of the multicast packet are to be transmitted, to allocate a space in the memory for storage of a single copy of the multicast packet, to replicate and transmit multiple copies of the stored copy of the multicast packet through the egress interfaces, to maintain a count of the replicated copies that have been transmitted, and when the count reaches the identified number, to release the allocated space in the memory. The method of the '567 Patent Application may be implemented in the network device 10 for storing a single copy of a multicast packet in the memory 14, or alternatively any suitable method for processing and storing a single copy of a multicast packet may be implemented by the network device 10.

Upon receiving an incoming data packet, whether unicast or multicast, one of the ingress ports 12-1 may place the packet in the memory 14 and notify the packet processing logic 16 that the packet is ready for processing. The packet processing logic 16 may parse the packet header and generate one or more packet descriptors. Based on the descriptors, for example, the packet processing logic 16 typically determines an egress port or ports 12-2 through which the packet is to be transmitted. The descriptor may also indicate the quality of service (QoS) to be applied to the packet, i.e., the level of priority for transmission, and any applicable instructions for modification of the packet header. For multicast packets, the packet processing logic 16 typically generates multiple descriptors, one for each egress port 12-2 that is to transmit a copy of the packet. All of these descriptors may have the same QoS (indicated, for example, by a QoS index value), or they may be assigned to two or more different QoS levels for different egress ports 12-2.

The packet processing logic 16 may place the descriptor in the appropriate queues, to await transmission via the designated egress ports 12-2. Typically, there is a dedicated queue for each egress port 12-2 or multiple queues per egress port, one for each QoS level.

When a descriptor reaches the head of its queue, the packet processing logic 16 replicates a copy of the appropriate multicast packet data from the memory 14, and makes whatever changes are called for in the packet header for transmission to the network through appropriate egress port 12-2. Upon the transmission of the last packet copy through the corresponding egress port 12-2, the packet processing logic 16 releases the location of that packet in the memory 14, so that the packet's location in memory 14 can be overwritten. This memory accounting and management process typically takes place for multiple different packets in parallel at any given time.

The functionality of the ports 12, packet processing logic 16, switch fabric 18, and the controller 20 may be implemented using a single physical component or, alternatively, implemented using multiple physical components. These physical components may comprise hard-wired or programmable devices, or a combination of the two. In some embodiments, at least some of the functions described above may be carried out by a programmable processor under the control of suitable software. This software may be downloaded to the network device 10 in electronic form, over a network, for example. Alternatively, or additionally, the software may be stored in tangible, non-transitory computer-readable storage media, such as optical, magnetic, or electronic memory.

Figure 2:
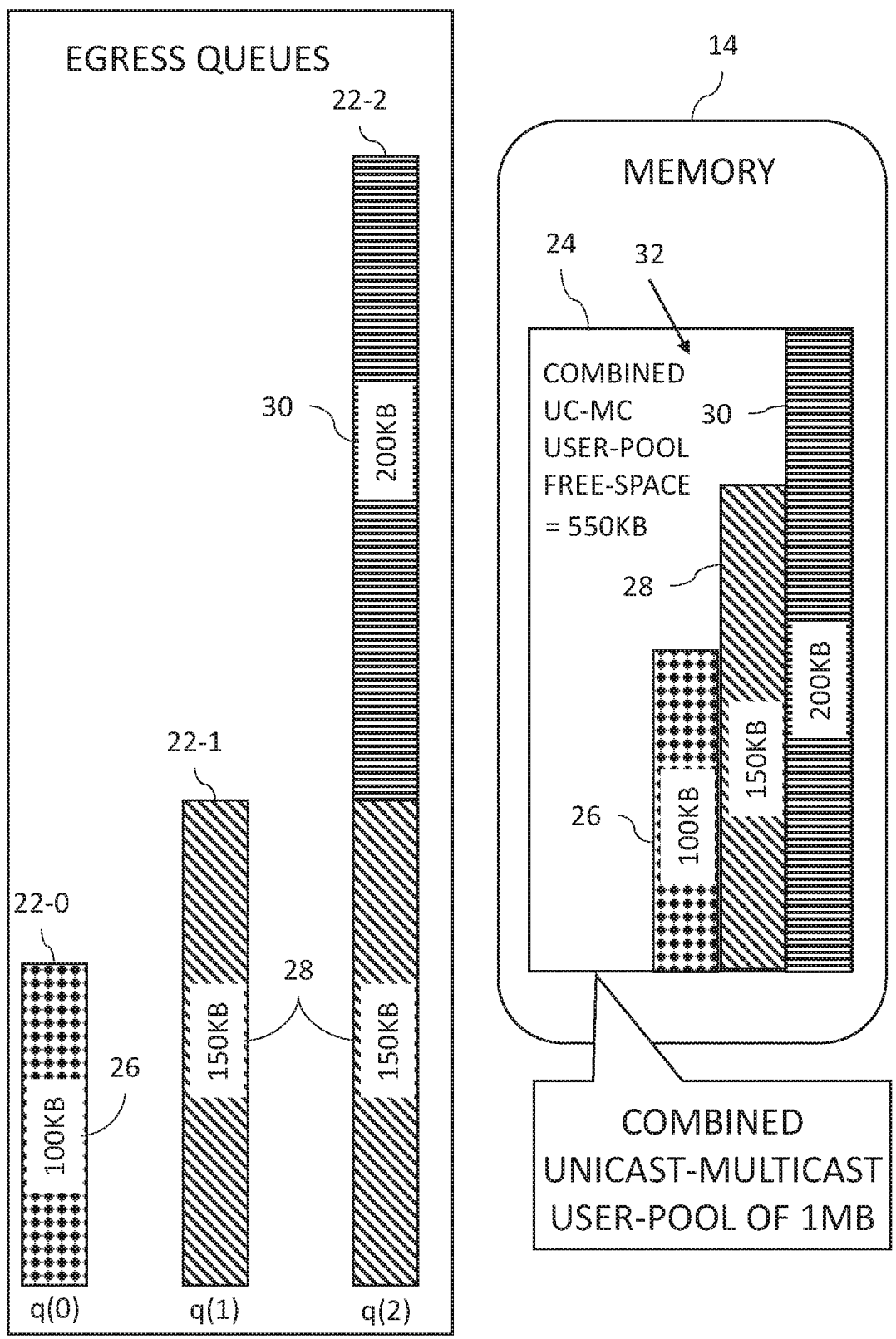
FIG. 2 is a schematic view of exemplary egress queues and a combined unicast-multicast user-pool used in the network device of FIG. 1.

Reference is now made to FIG. 2, which is a schematic view of exemplary egress queues 22 and a combined unicast-multicast user-pool 24 used in the network device 10 of FIG. 1. In this example, the combined unicast-multicast user-pool 24 has a maximum storage space of 1 MB and is stored in the memory 14.

The egress queues 22 include three egress queues, q(0), q(1), and q(2) also labeled 22-0, 22-1, and 22-2, respectively. In this example, q(0) is a unicast egress queue including 100 KB of unicast data packets 26, q(1) is a multicast egress queue including 150 KB of multicast data packets 28, and q(2) is a multicast egress queue including 150 KB of the multicast data packets 28 and 200 KB of multicast data packets 30 giving a total of 350 KB in q(2). 150 KB of the multicast data packets included in q(2) are the same 150 KB of multicast data packets included in q(1). The 150 KB of multicast packets 28 may be from the same network flow and have been assigned to different queues. For example, q(1) and q(2) may provide a different quality of service for the 150 KB of multicast data packets 28. As only single copies of the same packet are stored in the controller 20, the 150 KB of multicast packets 28 are only stored once in the combined unicast-multicast user-pool 24.

Therefore, the occupancy of q(0) is 100 KB corresponding to the unicast data packets 26, the occupancy of q(1) is 150 KB corresponding to the multicast data packets 28, and occupancy of q(2) is 350 KB corresponding to both the multicast data packets 28 and the multicast data packets 30.

A free-space 32 in the combined unicast-multicast user-pool 24 (also referred to herein as combined unicast-multicast user-pool free-space 32) is equal to the maximum size (e.g., 1 MB) of the combined unicast-multicast user-pool 24 less the occupancy of q(0) (e.g., 100 KB) less the space used by the multicast data packets 28 (e.g., 150 KB) and the multicast data packets 30 (e.g., 200 KB) in the combined unicast-multicast user-pool 24.

Therefore, the combined unicast-multicast user-pool free-space 32 is equal to 1 MB−100 KB−150 KB−200 KB giving 550 KB.

It can be seen that even though the multicast data packets 28 are counted in both the occupancy of q(1) and q(2), the multicast data packets 28 are only counted once in the computation of the free-space of the combined unicast-multicast user-pool 24.

The admission policy may be determined for each egress queue according to the following data:
q(0): occupancy=100 KB; user-pool free-space=550 KB.
q(1): occupancy=150 KB; user-pool free-space=550 KB.
q(2): occupancy=350 KB; user-pool free-space=550 KB.

It can be seen that the combined unicast-multicast user-pool free-space 32 used in the admission policy of each egress queue, whether a unicast egress queue or a multicast egress queue, is the same and shared, thereby promoting egress queue fairness and efficient memory utilization.

The following example assumes that packets are admitted to a queue when queue occupancy times factor A is less than the combined unicast-multicast user-pool free-space 32. For the sake of the following example, the value of factor A is assumed to be equal to 2 for each queue.

For q(0), occupancy of 100 KB times 2 (=200 KB) is less than 550 KB so a new packet for q(0) will be allowed in the combined unicast-multicast user-pool 24.

For q(1), occupancy of 150 KB times 2 (=300 KB) is less than 550 KB so a new packet for q(1) will be allowed in the combined unicast-multicast user-pool 24.

For q(2), occupancy of 350 KB times 2 (=700 KB) is more than 550 KB so a new packet for q(2) will be not allowed in the combined unicast-multicast user-pool 24. The new packet may be dropped or assigned to another multicast egress queue such as q(0). New packets will not be admitted to q(2) until the load in q(2) decreases according to the above admission policy.

In general, the factor A may have any suitable value from 0 to infinity and may be different for different queues thereby incorporating a priority (e.g., associated with a quality of service) associated with any particular queue. For example, a queue may be assigned a very high priority thereby ensuring that packets from that queue always pass the admission policy.

Figure 3:
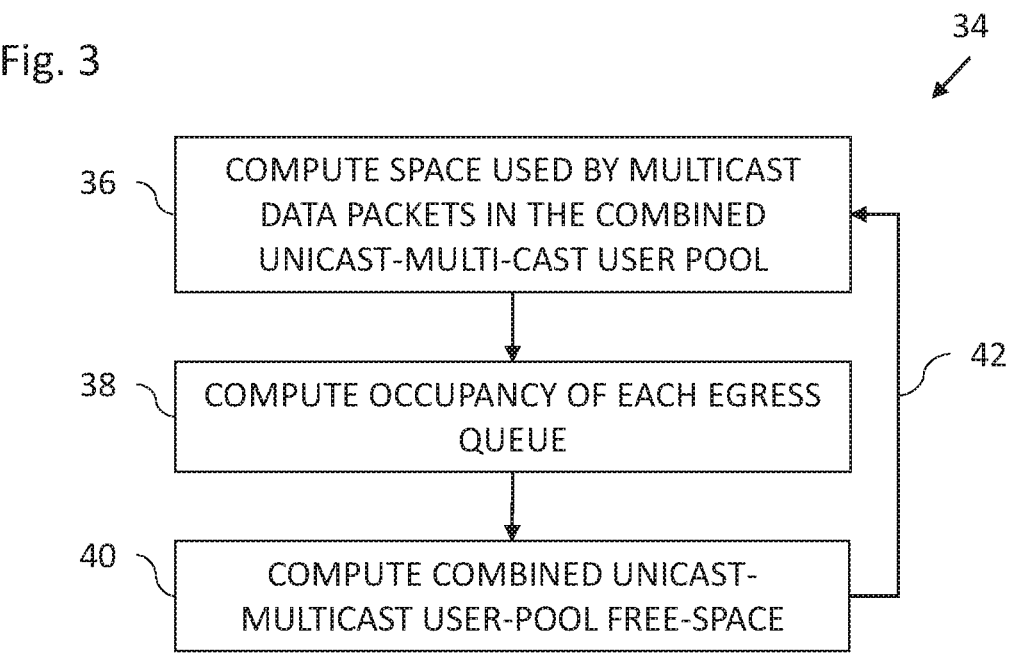
FIG. 3 is a flowchart including exemplary steps in a method of computing combined unicast-multicast user-pool free-space and egress-queue occupancy in the network device of FIG. 1.

Reference is now made to FIG. 3, which is a flowchart 34 including exemplary steps in a method of computing the combined unicast-multicast user-pool free-space 32 (FIG. 2) and egress-queue occupancy in the network device 10 of FIG. 1.

The packet processing logic 16 (FIG. 1) is configured to compute (block 36) a space used by the multicast data packets in the combined unicast-multicast user-pool 24 (FIG. 2) based on counting only once multicast packets stored once in the combined unicast-multicast user-pool 24 but assigned to at least two egress queues of a plurality of unicast and multicast egress queues and/or addressed for multiple destinations and/or assigned to at least two egress ports 12-2 (FIG. 1) and/or assigned multiple times to at least one of the plurality of unicast and multicast egress queues.

The packet processing logic 16 is configured to compute (block 38) an occupancy of each egress queue of the plurality of unicast and multicast egress queues by counting a space used by the data packets of that egress queue in the combined unicast-multicast user-pool 24. In some embodiments, the packet processing logic 16 is configured to compute the occupancy of each egress queue by counting a space used by each of the data packets of that egress queue in the combined unicast-multicast user-pool 24 wherein some of the counted data packets of that egress queue are also in at least another egress queue of the plurality of unicast and multicast egress queues.

The packet processing logic 16 (FIG. 1) is configured to compute (block 40) the combined unicast-multicast user-pool free-space 32 (FIG. 2) based on a size (e.g., maximum size) of the combined unicast-multicast user-pool 24 less a space used in the combined unicast-multicast user-pool by the unicast data packets 26 (FIG. 2) (e.g., the computed occupancy of the unicast egress queues) and the space used by the multicast data packets 28, 30 (FIG. 2) without double counting (e.g., the space computed in the step of block 36).

The packet processing logic 16 (FIG. 1) is configured to recompute (arrow 42) the space computed in the step of block 36, the occupancy of each egress queue, and the combined unicast-multicast user-pool free-space 32 periodically, for example, but not limited to, every X milliseconds or whenever a packet enters or leaves one of the egress queues.

Figure 4:
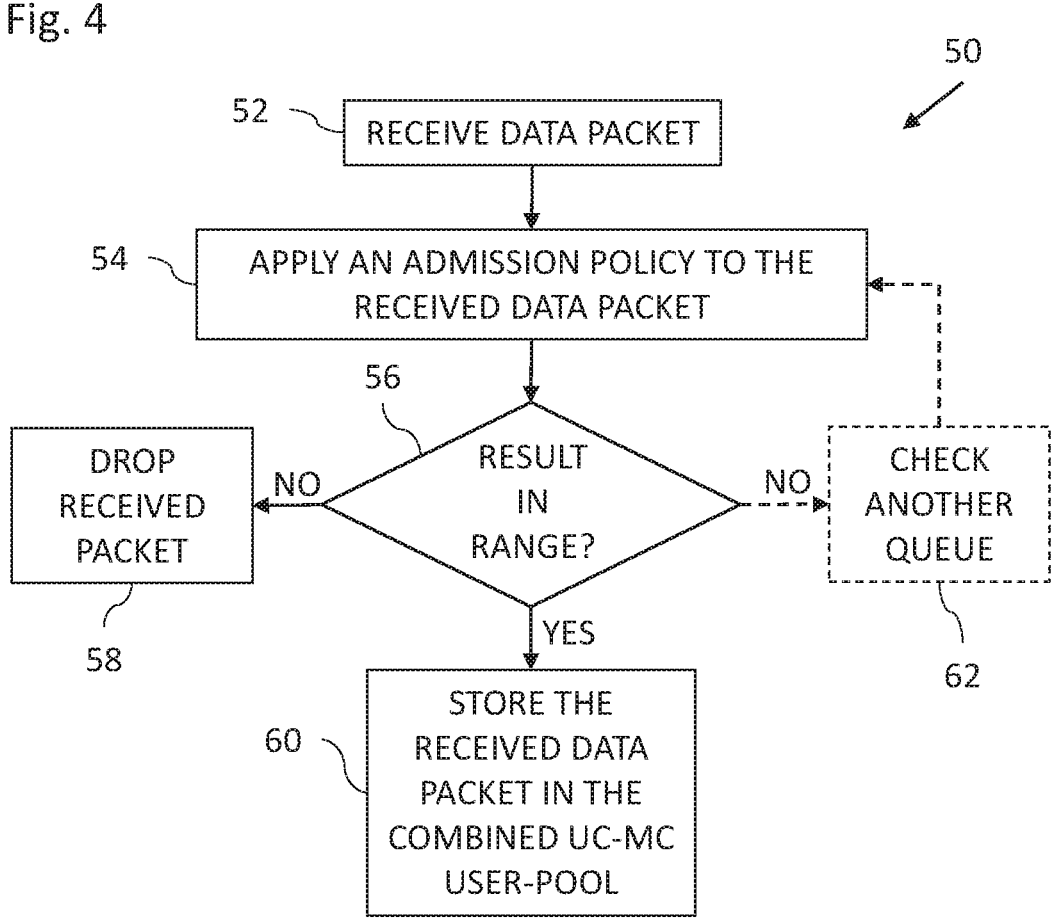
FIG. 4 is a flowchart including exemplary steps in a method of applying an admission policy in the network device of FIG. 1.

Reference is now made to FIG. 4, which is a flowchart 50 including exemplary steps in a method of applying an admission policy in the network device 10 of FIG. 1.

One of the ports 12 is configured to receive (block 52) a data packet, which may be a unicast or multicast data packet.

The packet processing logic 16 is configured to apply (block 54) an admission policy to the received data packet for entry into a given one of the egress queues based on at least the computed occupancy of that egress queue and the computed combined unicast-multicast user-pool free-space 32. In some embodiments, the packet processing logic 16 is configured to admit the received data packet to the egress queue based at least on the computed occupancy of the egress queue being less than a given fraction of the computed combined unicast-multicast user-pool free-space 32. For example, packets are admitted to a queue where queue occupancy times factor A is less than (or less than or equal to) the combined unicast-multicast user-pool free-space 32 or queue occupancy is less than (or less than or equal to) the combined unicast-multicast user-pool free-space 32 times factor A.

In some embodiments the given fraction is the same for different egress queues of the plurality of unicast and multicast egress queues. For example, factor A is the same for each unicast and multicast egress queue.

In some embodiments, the packet processing logic 16 is configured to apply the admission policy to the received data packet for entry into a given one of the egress queues based on at least the computed occupancy of that egress queue and the computed combined unicast-multicast user-pool free-space 32 and a weighted random early detection (WRED)

profile so that the received packet has some probability of being dropped according to a status of the given egress queue.

In other embodiments, the given fraction is based at least on a priority of each egress queue. For example, the factor A may be different for different egress queues according to a priority associated with each egress queue.

It can be seen from the above description that applying the admission policy for entry to the plurality of unicast and multicast egress queues, by the packet processing logic 16, provides egress queue fairness between at least two of the multicast egress queues of the plurality of unicast and multicast egress queues, and between at least one multicast egress queue and at least one unicast egress queue of the plurality of unicast and multicast egress queues.

A result of applying the admission policy to a received packet is checked by the packet processing logic 16 at a decision block 56 to determine if the result is in-range (e.g. if the computed occupancy of the egress queue is less than the given fraction of the computed combined unicast-multicast user-pool free-space 32). The packet processing logic 16 is configured, responsively to the result of applying the admission policy to the received data packet, to drop (block 58) the received data packet (if the result is not in-range) or to store (block 60) the received data packet in the combined unicast-multicast user-pool 12 (if the result is in-range). Additionally, or alternatively, the packet processing logic 16 is configured, responsively to the result of applying the admission policy to the received data packet to set at least one congestion flag of the received data packet. The congestion flag may be used to inform the end-point about network congestion and take any appropriate action. It should be noted that there may be other tests applied to determine whether the received data packet may be stored in the combined unicast-multicast user-pool 24 such as checking if there is space in the memory 14 for a packet descriptor associated with the received data packet. In some embodiments, if the result is not in-range, the packet processing logic 16 is configured to check (block 62) another egress queue to see if the received data packet could be admitted to that other queue.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and subcombinations of the various features described hereinabove, as well as variations and modifications thereof which would occur to persons skilled in the art upon reading the foregoing description and which are not disclosed in the prior art.

What is claimed is:

1. A network device, comprising:
    multiple ports configured to be connected to a packet data network so as to serve as both ingress and egress ports in receiving and forwarding of data packets including unicast data packets and multicast data packets from and to the network by the device;
    a memory coupled to the ports and configured to contain a combined unicast-multicast user-pool storing the received unicast and multicast data packets assigned to a plurality of egress queues while awaiting transmission to the network, including at least first and second egress queues for respective first and second destinations of the multicast data packets in a given flow; and
    packet processing logic configured to:
        compute a combined unicast-multicast user-pool free-space based on a size of the combined unicast-multicast user-pool less a space used in the combined unicast-multicast user-pool by the unicast data packets and the multicast data packets received through the ingress ports but not yet transmitted through the egress ports, the space used by the multicast data packets being based on counting only once each of at least some of the multicast data packets stored once in the combined unicast-multicast user-pool such that each of the multicast data packets in the given flow that is queued in both of the first and second egress queues is counted once in computing the combined unicast-multicast user-pool free-space;
        compute a respective occupancy of each of the plurality of egress queues by counting both the unicast data packets and the multicast data packets in each egress queue, such that each of the multicast data packets in the given flow that is queued in both of the first and second egress queues is counted at least a first time in computing the occupancy of the first egress queue and a second time in computing the occupancy of the second egress queue; and
        apply an admission policy to a received data packet for entry into at least the first and second egress queues based on at least the computed respective occupancy of each of the first and second egress queues and the computed combined unicast-multicast user-pool free-space.

2. The device according to claim 1, wherein the packet processing logic is configured, responsively to a result of applying the admission policy to the received data packet, to drop the received data packet; or store the received data packet in the combined unicast-multicast user-pool.

3. The device according to claim 2, wherein the packet processing logic is configured, responsively to the result of applying the admission policy to the received data packet, to set at least one congestion flag of the received data packet.

4. The device according to claim 1, wherein the packet processing logic is configured to apply the admission policy to the received data packet for entry into the at least one egress queue based on at least the computed occupancy of the at least one egress queue and the computed combined unicast-multicast user-pool free-space, and a weighted random early detection (WRED) profile.

5. The device according to claim 1, wherein the packet processing logic is configured to compute the space used by the multicast data packets based on counting only once each of at least some of the multicast packets stored once in the combined unicast-multicast user-pool but addressed for multiple destinations or stored once in the combined unicast-multicast user-pool but assigned multiple times to at least one of the plurality of unicast and multicast egress queues.

6. The device according to claim 1, wherein the packet processing logic is configured to compute the occupancy of the at least one egress queue by counting a space used by each of the data packets of the at least one egress queue in the combined unicast-multicast user-pool, some of the counted data packets of the at least one egress queue also being in at least another egress queue of the plurality of unicast and multicast egress queues.

7. The device according to claim 1, wherein the packet processing logic is configured to apply the admission policy for entry to the plurality of unicast and multicast egress queues thereby providing egress queue fairness between at least two of the multicast egress queues of the plurality of unicast and multicast egress queues, and between at least one multicast egress queue and at least one unicast egress queue of the plurality of unicast and multicast egress queues.

8. The device according to claim 1, wherein the packet processing logic is configured to recompute the combined unicast-multicast user-pool free-space and the occupancy of each at least one egress queue periodically.

9. The device according to claim 1, wherein the packet processing logic is configured to admit the received data packet to the at least one egress queue based at least on the computed occupancy of the at least one egress queue being less than a given fraction of the computed combined unicast-multicast user-pool free-space.

10. The device according to claim 9, wherein the given fraction is the same for different egress queues of the plurality of unicast and multicast egress queues.

11. The device according to claim 9, wherein the given fraction is based at least on a priority of the at least one egress queue.

12. An egress queue fairness method, comprising:
receiving and forwarding of data packets including unicast data packets and multicast data packets from and to a network;
containing a combined unicast-multicast user-pool storing the received unicast and multicast data packets assigned to a plurality of egress queues while awaiting transmission to the network, including at least first and second egress queues for respective first and second destinations of the multicast data packets in a given flow;
computing a combined unicast-multicast user-pool free-space based on a size of the combined unicast-multicast user-pool less a space used in the combined unicast-multicast user-pool by the unicast data packets and the multicast data packets received through the ingress ports but not yet transmitted through the egress ports, the space used by the multicast data packets being based on counting only once each of at least some of the multicast data packets stored once in the combined unicast-multicast user-pool such that each of the multicast data packets in the given flow that is queued in both of the first and second egress queues is counted once in computing the combined unicast-multicast user-pool free-space;
computing a respective occupancy of each of the plurality of egress queues by counting both the unicast data packets and the multicast data packets in each egress queue, such that each of the multicast data packets in the given flow that is queued in both of the first and second egress queues is counted at least a first time in computing the occupancy of the first egress queue and a second time in computing the occupancy of the second egress queue; and
applying an admission policy to a received data packet for entry into at least the first and second egress queues based on at least the computed respective occupancy of each of the first and second egress queues and the computed combined unicast-multicast user-pool free-space.

13. The method according to claim 12, further comprising, responsively to a result of the applying the admission policy to the received data packet dropping the received data packet or storing the received data packet in the combined unicast-multicast user-pool.

14. The method according to claim 13, further comprising, responsively to the result of the applying the admission policy to the received data, setting at least one congestion flag of the received data packet.

15. The method according to claim 12, wherein the applying includes applying the admission policy to the received data packet for entry into the at least one egress queue based on at least the computed occupancy of the at least one egress queue and the computed combined unicast-multicast user-pool free-space, and a weighted random early detection (WRED) profile.

16. The method according to claim 12, further comprising computing the space used by the multicast data packets based on counting only once each of at least some of the multicast packets stored once in the combined unicast-multicast user-pool but addressed for multiple destinations or stored once in the combined unicast-multicast user-pool but assigned multiple times to at least one of the plurality of unicast and multicast egress queues.

17. The method according to claim 12, further comprising computing the occupancy of the at least one egress queue by counting the space used by each of the data packets of the at least one egress queue in the combined unicast-multicast user-pool, some of the counted data packets of the at least one egress queue also being in at least another egress queue of the plurality of unicast and multicast egress queues.

18. The method according to claim 12, further comprising applying the admission policy for entry to the plurality of unicast and multicast egress queues thereby providing egress queue fairness between at least two of the multicast egress queues of the plurality of unicast and multicast egress queues, and between at least one multicast egress queue and at least one unicast egress queue of the plurality of unicast and multicast egress queues.

19. The method according to claim 12, further comprising recomputing the combined unicast-multicast user-pool free-space and the occupancy of each at least one egress queue periodically.

20. The method according to claim 12, further comprising admitting the received data packet to the at least one egress queue based at least on the computed occupancy of the at least one egress queue being less than a given fraction of the computed combined unicast-multicast user-pool free-space.

21. The method according to claim 20, wherein the given fraction is the same for different egress queues of the plurality of unicast and multicast egress queues.

22. The method according to claim 20, wherein the given fraction is based at least on a priority of the at least one egress queue.

23. A software product, comprising a non-transitory computer-readable medium in which program instructions are stored, which instructions, when read by a central processing unit (CPU), cause the CPU to:
receive and forward data packets including unicast data packets and multicast data packets from and to a network;
contain a combined unicast-multicast user-pool storing the received unicast and multicast data packets assigned to a plurality of egress queues while awaiting transmission to the network, including at least first and second egress queues for respective first and second destinations of the multicast data packets in a given flow;

compute a combined unicast-multicast user-pool free-space based on a size of the combined unicast-multicast user-pool less a space used in the combined unicast-multicast user-pool by the unicast data packets and the multicast data packets received through the ingress ports but not yet transmitted through the egress ports, the space used by the multicast data packets being based on counting only once each of at least some of the multicast data packets stored once in the combined unicast-multicast user-pool such that each of the multicast data packets in the given flow that is queued in both of the first and second egress queues is counted once in computing the combined unicast-multicast user-pool free-space;

compute an a respective occupancy of each of the plurality of egress queues by counting both the unicast data packets and the multicast data packets in each egress queue, such that each of the multicast data packets in the given flow that is queued in both of the first and second egress queues is counted at least a first time in computing the occupancy of the first egress queue and a second time in computing the occupancy of the second egress queue; and apply an admission policy to a received data packet for entry into at least the first and second egress queues based on at least the computed respective occupancy of each of the first and second egress queues and the computed combined unicast-multicast user-pool free-space.

* * * * *